United States Patent
Dimitri et al.

(10) Patent No.: US 6,602,039 B1
(45) Date of Patent: Aug. 5, 2003

(54) AUTOMATED DATA STORAGE SYSTEM AND APPARATUS AND METHOD FOR REMOVING AN ACCESSOR FROM SAME

(75) Inventors: Kamal Emile Dimitri, Tucson, AZ (US); John Edward Kulakowski, Tucson, AZ (US); Rodney Jerome Means, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 09/716,679

(22) Filed: Nov. 20, 2000

(51) Int. Cl.$^7$ .............................. B65G 1/00; B65G 65/00
(52) U.S. Cl. .......................... 414/281; 360/92; 269/17; 104/262
(58) Field of Search ............................. 414/273, 279, 414/284, 281, 283; 360/92; 269/17; 104/262, 263, 48, 32.1

(56) References Cited

U.S. PATENT DOCUMENTS

| | | | |
|---|---|---|---|
| 3,817,406 A | * 6/1974 | Sawada et al. | 414/279 |
| 5,054,986 A | * 10/1991 | Hirano et al. | 414/284 XV |
| 5,303,214 A | 4/1994 | Kulakowski et al. | 369/34 |
| 5,421,003 A | 5/1995 | Escola et al. | 395/575 |
| 5,471,561 A | 11/1995 | Cowgill et al. | 395/82 |
| 5,479,581 A | 12/1995 | Kleinschnitz | 395/82 |
| 5,504,873 A | 4/1996 | Martin et al. | 395/438 |
| 5,513,156 A | 4/1996 | Hanaoka et al. | 369/34 |
| 5,613,154 A | 3/1997 | Burke et al. | 395/821 |
| 5,914,919 A | 6/1999 | Fosler et al. | 369/34 |
| 5,940,243 A | 8/1999 | Kanetsuku et al. | 360/92 |
| 5,967,339 A | 10/1999 | Utsumi et al. | 211/41.12 |
| 6,149,366 A | * 11/2000 | Deandrea | 414/279 |

FOREIGN PATENT DOCUMENTS

GB   1351445   * 5/1974   ................. 414/279

OTHER PUBLICATIONS

IBM Technical Disclosure Bulletin, "Concurrent Fetching of Cartridges by Two Independent Library Pickers", vol. 37, No. 06B Jun. 1994, pp. 121–124.
IBM Technical Disclosure Bulletin, "Two Means of Improving Access to the Data in a Library Subsystem", vol. 33 No. 11 Apr. 1991, pp. 82–83.

* cited by examiner

*Primary Examiner*—Christopher P. Ellis
*Assistant Examiner*—Richard Ridley
(74) *Attorney, Agent, or Firm*—Dale F. Regelman

(57) ABSTRACT

Applicants' invention includes an automated data storage system which includes one or more data storage libraries each of which includes one or a plurality of accessors which retrieve data storage media from a plurality of storage slots and deliver that retrieved data storage media to a data storage drive unit, where each of the plurality of accessors includes one or more attachment slots and a plurality of retractable wheels, and a maintenance robot which includes a plurality of wheels and an attachment device which is capable of insertion into, and subsequent removal from, the attachment slot(s) located on each of the accessors. Applicants' invention further includes a method utilizing Applicants' maintenance robot to remove one of Applicants' accessors from a data storage library.

8 Claims, 8 Drawing Sheets

AUTOMATED DATA STORAGE SYSTEM AND APPARATUS AND METHOD FOR REMOVING AN ACCESSOR FROM SAME

FIELD OF THE INVENTION

The present invention relates to an automated data storage system having one or a plurality of data accessors, and an apparatus and a method to remove one of those data accessors from the automated data storage system.

BACKGROUND OF THE INVENTION

Automated data storage libraries are known for providing cost effective access to large quantities of stored data. Generally, data storage libraries include a large number of storage slots on which are stored portable data storage media. The typical portable data storage media is a tape cartridge, an optical cartridge, a disk cartridge, and the like. One (or more) accessor typically accesses the data storage media from the storage slots and delivers the accessed media to a data storage drive for reading and/or writing data on the accessed media. Suitable electronics both operate the accessor and operate the data storage drives to transmit and/or receive data from an attached on-line host computer system.

In a conventional automated data storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated data storage libraries today, each model displaying various different features. One example is the IBM 3494 Data Storage Library. Some of the automated data storage libraries have dual or multiple accessors to provide a level of redundancy, in that, one accessor is the "active" accessor and the other may take over the accessor function and be the active accessor.

In many conventional libraries, one of the accessors is always the active accessor, and the other(s) is always spare. For example, in a dual accessor automated data storage library, the active accessor conducts all of the operations to access and move the data storage media, and the other accessor is the spare and is moved out of the active operation area. In other conventional libraries, multiple accessors may share the active operation and no accessors are spare. Occasionally, an accessor may become unavailable, for example, if a component of the accessor must be replaced or repaired.

SUMMARY OF THE INVENTION

Applicants' invention includes a maintenance robot which can remove from Applicants' automated data storage system an accessor having an attachment slot(s) and retractable wheels. Applicants' maintenance robot includes a frame having a first support member pivotally connected thereto, a plurality of wheels rotatably mounted on said frame, and an attachment device mounted on the first support member. The attachment device is formed such that it can be inserted into, and subsequently removed from the attachment slot(s) located on the accessor. In one embodiment, the attachment device can be raised or lowered.

Applicants' invention also includes an automated data storage system. Applicants' automated data storage system includes at least one data storage library which includes a plurality of data storage media stored in a plurality of storage slots and at least one data storage drive for receiving said data storage media and reading and/or writing data thereon. Applicants' automated data storage system further includes a first rail system located within the data storage library, and one or a plurality of accessors for accessing and transporting the stored media between the individual storage slots and the data storage drive. Each these accessors includes a plurality of retractable wheels and an attachment slot(s). Each of these data accessors are moveably disposed on the first rail system.

Applicants' automated data storage system further includes a second rail system having a first end and a second end, with the first end located adjacent the first rail system. Applicants' maintenance robot is movably disposed on the second rail system.

Applicants' invention further includes a method to remove an accessor from Applicants' automated data storage system. Applicants' method includes the steps of: (i) positioning accessor on the first rail system adjacent the first end of the second rail system, (ii) positioning the maintenance robot on the second rail system adjacent the accessor, (iii) attaching the accessor to the maintenance robot, (iv) retracting the accessor's wheels, and (v) removing the maintenance robot and the attached accessor from the data storage library. In a separate embodiment, Applicants' method also includes a step wherein the maintenance robot lifts/lowers the attached accessor to completely remove that accessor from the first rail system.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1A:
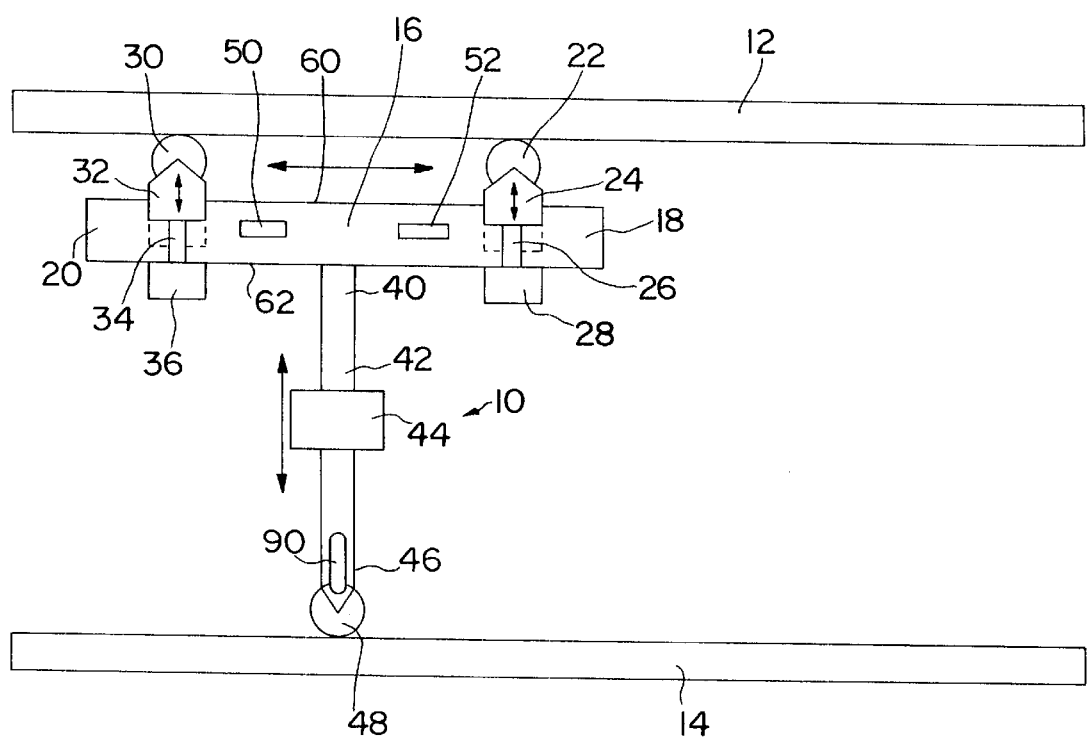
FIG. 1a is a side view of Applicants' data accessor.

Turning to FIG. 1a, accessor 10 includes rectangular frame 16 which has first end 18, second end 20, top side 60, and bottom side 62. Applicants use the terms "top" and "bottom" for descriptive purposes only, and those terms should not be construed as limiting. Attachment slots 50 and 52 are internally disposed within frame 16 and extend outwardly to communicate with the surface of frame 16. In the embodiment shown in FIG. 1a, slots 50 and 52 have a rectangular cross section. In other embodiments, slots 50 and 52 have a circular, ovoid, triangular, square, trapezoidal, pentagonal, or hexagonal cross section. Slots 50 and 52 may have the same shape and size, or may have differing shapes and sizes.

Pillar 42 has a first end 40 and a second end 46. First end 40 connects to bottom side 62 of frame 16 by way of an adhesive joint, a welded joint, metal screws, nuts and bolts, and the like. Wheel assembly 48 is rotatably disposed on second end 46. Motor 90 is disposed adjacent second end 46 and connects to wheel assembly 48. Operation of motor 90 in a first direction causes wheel 48 to rotate in a first direction. Operation of motor 90 in a second direction, i.e. the other direction, causes wheel 48 to rotate in a second direction.

Figure 1B:
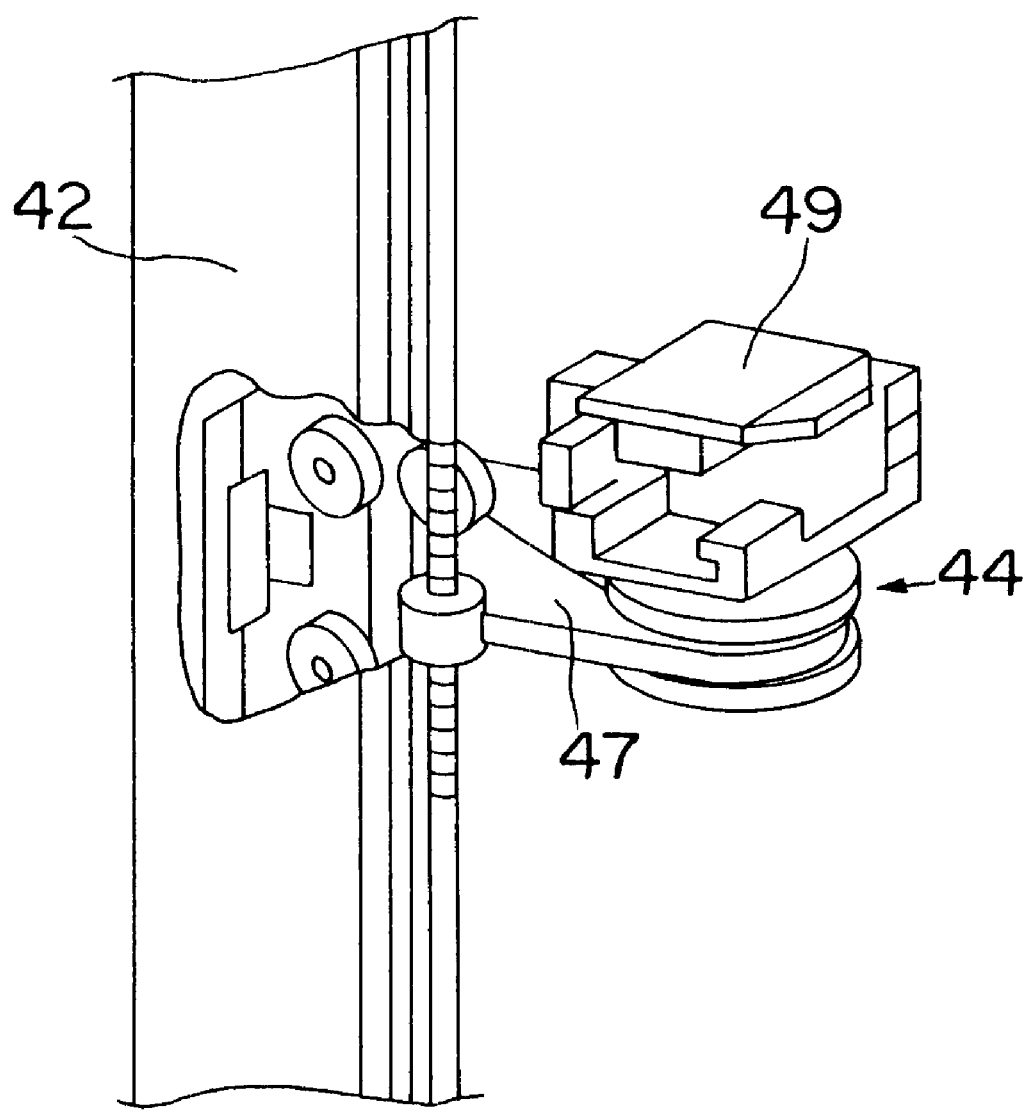
FIG. 1b is a perspective view of the robotic manipulator component of Applicants' data accessor.

Accessing mechanism 44 is movably disposed on pillar 42 such that accessing mechanism 44 travels bi-directionally along pillar 42 between first end 40 and second end 46. FIG. 1b shows accessing mechanism 44 is greater detail. Robotic manipulator 49 is mounted on carriage 47 which can move vertically along pillar 42.

Referring again to FIG. 1a, a first wheel assembly is disposed adjacent first end 18 of frame 16 such that guide wheel 22 is disposed above top surface 60. The first wheel assembly comprises guide wheel 22, retractable support 24, power lead screw 26, and gear motor 28. Gear motor 28 is disposed on bottom side 62 of frame 16 adjacent first end 18. One end of power lead screw 26 connects to gear motor 28 and the other end extends through frame 16 and connects to retractable support 24. Retractable support 24 is disposed between power lead screw 26 and wheel 22, such that retractable support 24 can be partially retracted into frame 16.

Similarly, a second wheel assembly is disposed adjacent second end 20 of frame 16 such that guide wheel 30 is disposed above top surface 60. The second wheel assembly comprises guide wheel 30, retractable support 32, power lead screw 34, and gear motor 36. Gear motor 36 is disposed on bottom side 62 of frame 16 adjacent second end 20. One end of power lead screw 34 connects to gear motor 36 and the other end extends through frame 16 and connects to retractable support 32. Retractable support 32 is disposed between power lead screw 34 and wheel 30, such that retractable support 32 can be partially retracted into frame 16.

Causing gear motor 28 to turn in a first direction causes wheel 22 to move in a first direction. Causing gear motor 28 to turn in a second direction, i.e. opposite to the first direction, causes wheel 22 to move in the opposite direction. Similarly, activation of gear motor 36 causes wheel 30 to move either upwardly or downwardly.

Figure 2:
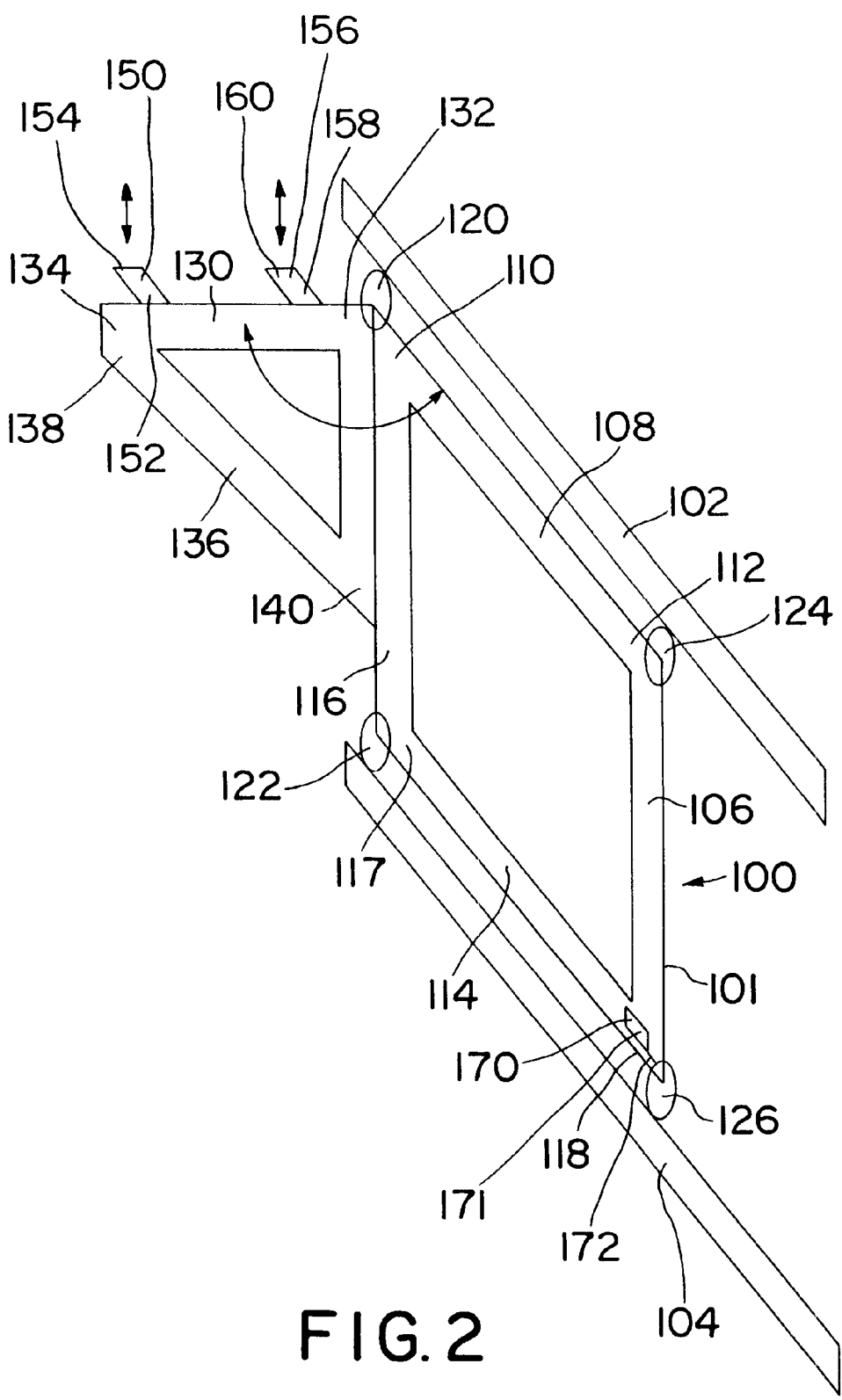
FIG. 2 is a side view of Applicants' maintenance robot.

FIG. 2 shows maintenance robot 100. Robot 100 includes frame 101 which is formed from top member 108, bottom member 114, first side member 116, and second side member 106. Applicants use the terms "top" and "bottom" for descriptive purposes only, and those terms should not be construed as limiting. First side member connects to first end 110 of top member 108 and to first end 117 of bottom member 114. Second side member 106 connects to second end 112 of top member 108 and to second end 118 of bottom member 114. The connections between top member 108, bottom member 114, first side member 116, and second side member 106 may be formed by welding, mechanical attachments such as metal screws and/or nuts/bolts, adhesive joining, and the like. Top member 108, bottom member 114, first side member 116 and second side member 106 may be formed from any rigid material including metal, plastic, wood, and combinations thereof. In preferred embodiments, these members are formed from aluminum or stainless steel. In a most preferred embodiment, these members are formed of Stainless Steel Type-304.

First wheel 120 is rotatably disposed on top member 108 adjacent first end 110. Second wheel 122 is rotatably disposed on bottom member 114 adjacent first end 117. Third wheel 124 is rotatably disposed on top member 108 adjacent second end 112. Fourth wheel 126 is rotatably disposed on bottom member 114 adjacent second end 118.

First support member 130 has distal end 134 and proximal end 132. Proximal end 132 is pivotably connected to top member 108 adjacent first end 110 such that first support member 130 can be rotated between a first position and a second position. In the first position, first support member 130 is folded against frame 101 such that first member 130 is parallel to, and adjacent, top member 108. In the second position, first support member 130 has been rotated 90 degrees outwardly from frame 101 such that first support member 130 is substantially perpendicular to top member 108. By substantially perpendicular, Applicants mean the angle formed by first support member 130 and top member 108 is about 90 degrees, plus or minus about 10 degrees.

Second support member 136 has top end 138 and bottom end 140. Top end 138 connects to distal end 134 of first support member 130 using the attachment methods described above. Bottom end 140 is pivotably attached to first side member 116.

An attachment device is disposed on first support member 130. In the embodiment shown in FIG. 2, this attachment device comprises engaging rod 150 and engaging rod 156. Engaging rod 150 has proximal end 152 and distal end 154. Proximal end 152 is attached to first support member 130 such that distal end 154 extends outwardly from first support member 130 and away from frame 101. Similarly, engaging rod 156 has proximal end 158 and distal end 160. Proximal end 158 is attached to first support member 130 such that distal end 160 extends outwardly from first support member 130 and away from frame 101.

Robot 100 is disposed between parallel rails 102 and 104 such that wheels 120 and 124 are movably disposed on rail 102 and wheels 122 and 126 are movably disposed on rail 104. Motor 170 is disposed on bottom member 114 adjacent end 118. External shaft 172 extends outwardly from distal end 171 of motor 170 and connects to wheel 126. Causing motor 170 to rotate in a first direction causes wheel 126 to rotate in a first direction which causes frame 101 to move along rails 102 and 104 in a first direction. Causing first motor 170 to operate in the opposite direction thereby causes wheel 126 to rotate in a second direction which causes frame 101 to move along rails 102/104 in the second, i.e. opposite, direction.

Figure 3A:
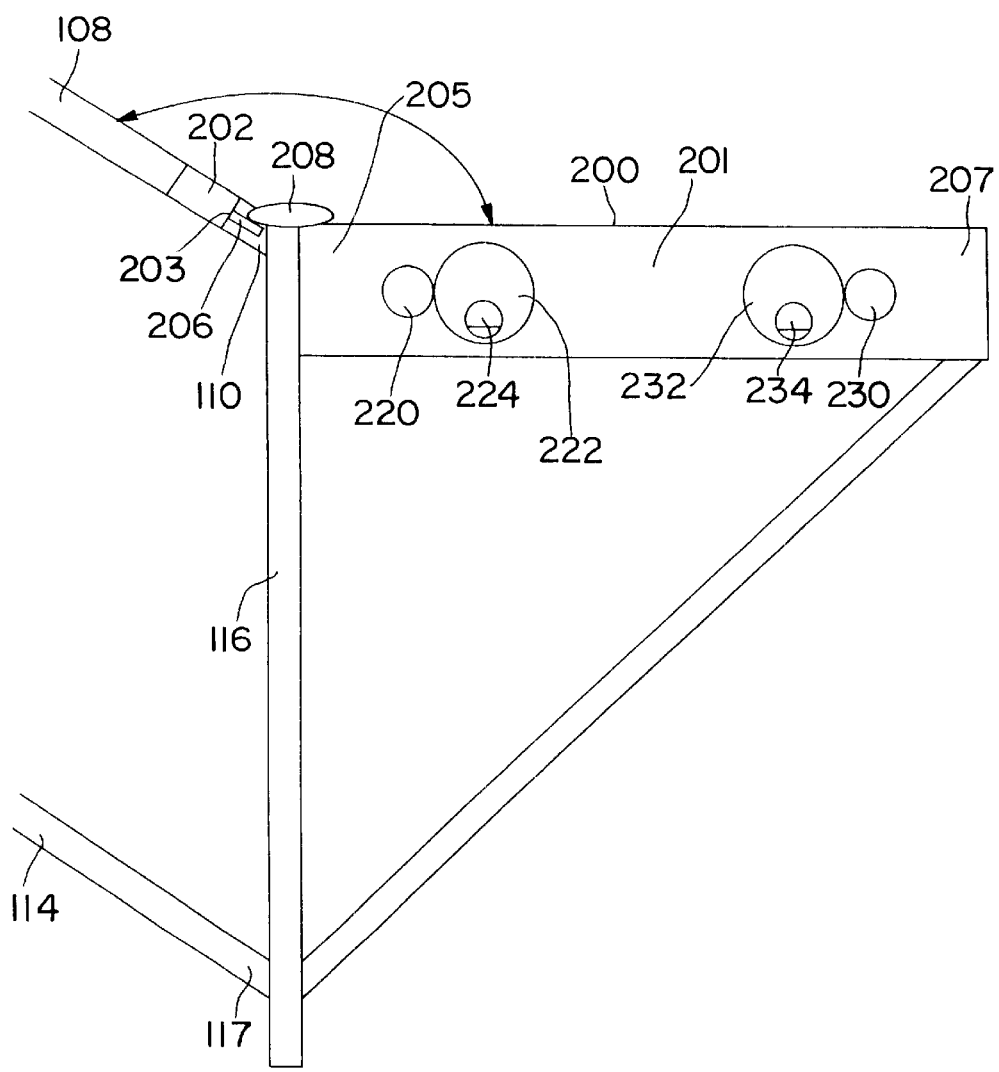
FIG. 3a is a side view of one embodiment of the support member component of Applicants' maintenance robot.

Referring to FIG. 3a, first support member 200 is pivotably connected to top member 108 of frame 101 (FIG. 2). Motor 202 is disposed on top member 108 adjacent end 110. External rotatable shaft 206 extends outwardly from distal end 203 of motor 202. Pivot gear 208 is disposed on first support member 200 adjacent end 205. The distal portion of shaft 206 slidingly interconnects with pivot gear 208 such that rotation of shaft 206 in a first direction causes first support member 200 to rotate outwardly from frame 101. Pivot gear 208 limits the outward rotation of first support member 200 to a second position wherein first support member 200 is substantially perpendicular to frame 101. By substantially perpendicular, Applicants mean first the angle formed between first support member 200 and frame 101 is about 90 degrees, plus or minus about 10 degrees. Rotation of pivot gear 208 in a second direction, i.e. opposite from the first direction, causes first support member 200 to pivot inwardly toward frame 101. Pivot gear 208 limits the inward rotation of first support member 200 to a first position wherein first support member 200 is adjacent to and parallel to top member 108. In this first position, side 201 of first support member 200 faces away from top member 108.

Motor 220 and rotatable gear 222 are disposed on side 201 of first support member 200. Engaging rod 224 is mounted in an off-axis configuration to gear 222. Gear 222 intermeshes with motor 220, such that operation of motor 220 causes gear 222 to rotate 180 degrees between a first position (shown in FIG. 3a) wherein engaging rod 224 is disposed at the bottom of gear 222, and a second position wherein engaging rod 222 is disposed at the top of gear 222 (not shown in FIG. 3a).

Similarly, motor 230 and rotatable gear 232 are disposed on side 201 of first support member 130 outwardly of motor 220/gear 222. Engaging rod 234 is mounted in an off-axis configuration to gear 232. Gear 232 intermeshes with motor 230, such that operation of motor 230 causes gear 232 to rotate 180 degrees between a first position (shown in FIG. 3a) wherein engaging rod 234 is disposed at the bottom of gear 232, and a second position wherein engaging rod 232 is disposed at the top of gear 232 (not shown in FIG. 3a).

In the embodiment shown in FIG. 3a, engagement rods 224 and 234 have a circular cross section. In other embodiments of Applicants' invention, engagement rods 224 and 234 have an ovoid, triangular, square, trapezoidal, pentagonal, or hexagonal cross section. Engagement rod 224 may have the same cross section as does engagement rod 234. In the alternative, engagement rods 224 and 234 may have differing cross sections. Referring to the embodiment shown in FIG. 3b, engagement rod 224 is circular and has a proximal portion 226 having a first diameter $d_1$, a middle portion 228 having a second diameter $d_2$, and distal portion 232 having a third diameter $d_3$. Notch 240 is disposed in middle portion 228 such that $d_2$ is smaller than either $d_1$ or $d_3$. First diameter $d_1$ may equal third diameter $d_3$, or $d_1$ may be either greater than or less than $d_3$. Regardless of the cross section shape, i.e. square, rectangular, oval, ovoid, trapezoidal, pentagonal, or hexagonal, distance $d_2$ is shorter than either $d_1$ or $d_3$.

Figure 4:
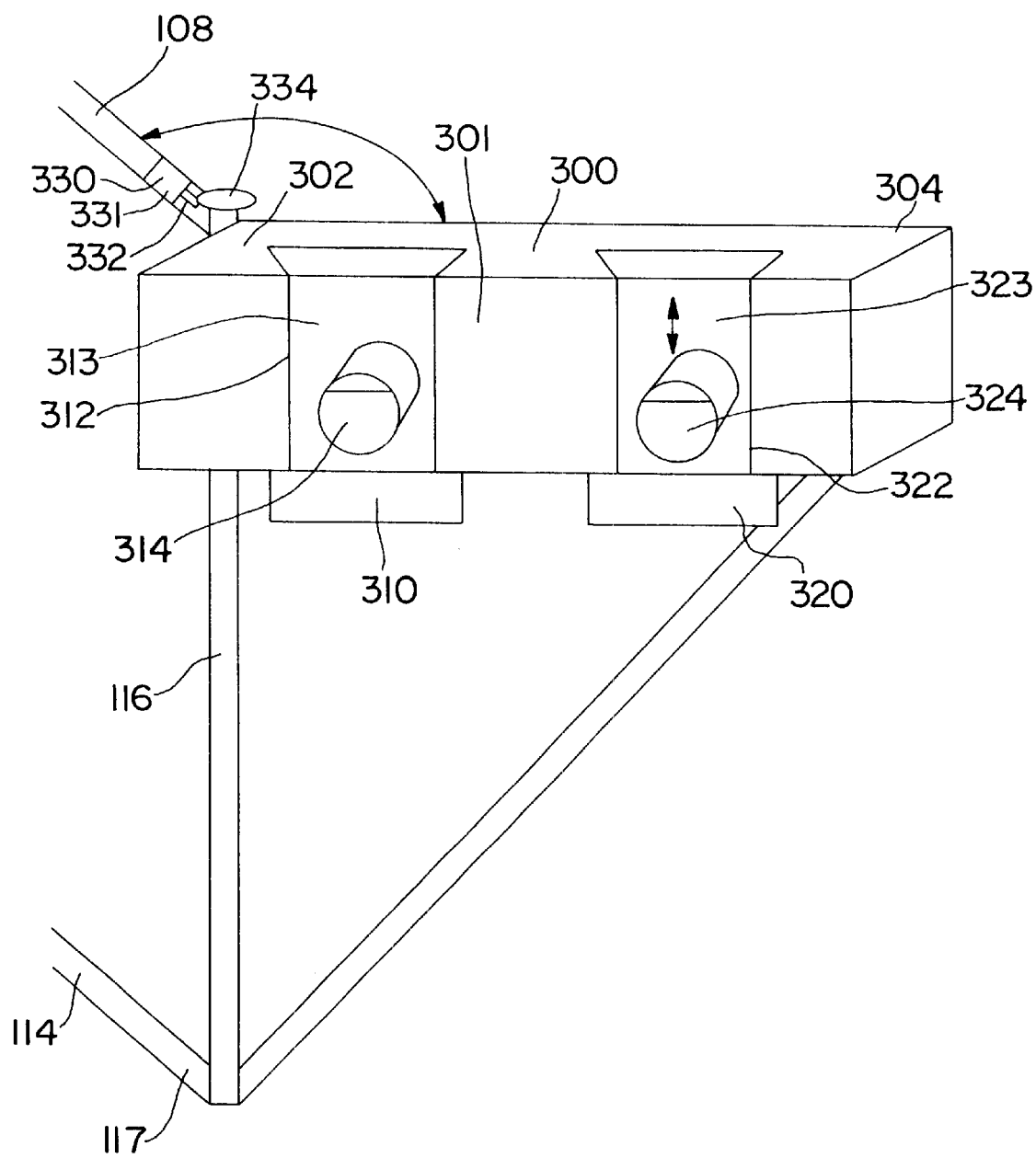
FIG. 4 is a side view of a second embodiment of the support member component of Applicants' maintenance robot.

In the embodiment shown in FIG. 4, proximal end 302 of first support member 300 is pivotably attached to top member 108. Motor 330 is disposed on top member 108 adjacent end 110. External rotatable shaft 332 extends outwardly from distal end 331 of motor 330. Pivot gear 334 limits the outward rotation of first support member 300 to a second position wherein first support member 300 is substantially perpendicular to frame 101. By substantially perpendicular, Applicants mean first the angle formed between first support member 300 and frame 101 is about 90 degrees, plus or minus about 10 degrees. Rotation of pivot gear 334 in a second direction, i.e. opposite from the first direction, causes first support member 300 to pivot inwardly toward frame 101. Pivot gear 334 limits the inward rotation of first support member 300 to a first position wherein first support member 300 is adjacent to and parallel to top member 108. In this first position, side 301 of first support member 300 faces away from top member 130.

Vertically-movable member 312 is internally disposed within support member 300 such that outer surface 313 is contiguous with side 301 of member 300. Although vertically-movable member 312 is shown having a trapezoidal shape in FIG. 4. In other embodiments, vertically movable member 312 can have a square or rectangular shape.

Figure 3B:
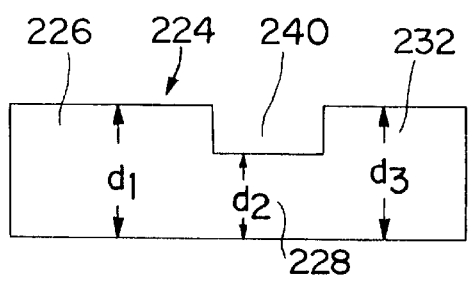
FIG. 3b is a side view of one embodiment of the engagement rod component of Applicants' maintenance robot.

Engagement rod 314 is disposed on side 313 of vertically-movable member 300. Although engagement rod 314 is shown in FIG. 4 having a circular cross section, engagement rod 314 can also have a triangular, square, rectangular, pentagonal, or hexagonal cross section. In other embodiments of Applicants' invention, engagement rod 314 may have a notched structure as shown in FIG. 3b.

Motor 310 is disposed on the bottom of member 300 and connects to vertically-movable member 312. Operation of motor 310 in one direction raises engagement rod 314 while operation of motor 310 in the opposite direction lowers engagement rod 314.

Vertically-movable member 322 is internally disposed within support member 300 such that outer surface 323 is continuous with side 301. Although vertically-movable member 322 is shown having a trapezoidal shape in FIG. 4. In other embodiments, vertically movable member 322 can have a square or rectangular shape.

Engagement rod 324 is disposed on side 313 of vertically-movable member 300. Although engagement rod 324 is shown in FIG. 4 having a circular cross section, engagement rod 324 can also have a triangular, square, rectangular, pentagonal, or hexagonal cross section. In other embodiments of Applicants' invention, engagement rod 324 may have a notched structure as shown in FIG. 3b.

Motor 320 is disposed on the bottom of member 300 and connects to vertically-movable member 322. Operation of motor 320 in one direction raises engagement rod 324, while operation of motor 320 in the opposite direction lowers engagement rod 324.

The embodiment shown in FIG. 4 includes two engagement rods, namely rods 314 and 324. In other embodiments, a single engagement rod or a plurality of engagement rods are used. In the embodiment shown in FIG. 4, engagement rods 314 and 324 have a similar size and shape. In other embodiments, the one or plurality of engagement rods used may have differing sizes and shapes.

FIG. 5 illustrates an embodiment of Applicants' invention wherein a maintenance robot, formed as described above, removes an accessor, formed as described above, from a media storage library. FIGS. 5a through 5f illustrate the steps of Applicants' method wherein maintenance robot 420 approaches accessor 406, rotates support member 424 outwardly, attaches accessor 406 to support member 424, rotates support member 424 inwardly, and carries accessor out of library 402. Removal of an accessor may be required for a number of purposes, including routine maintenance, repair, and/or modification.

Figure 5A:
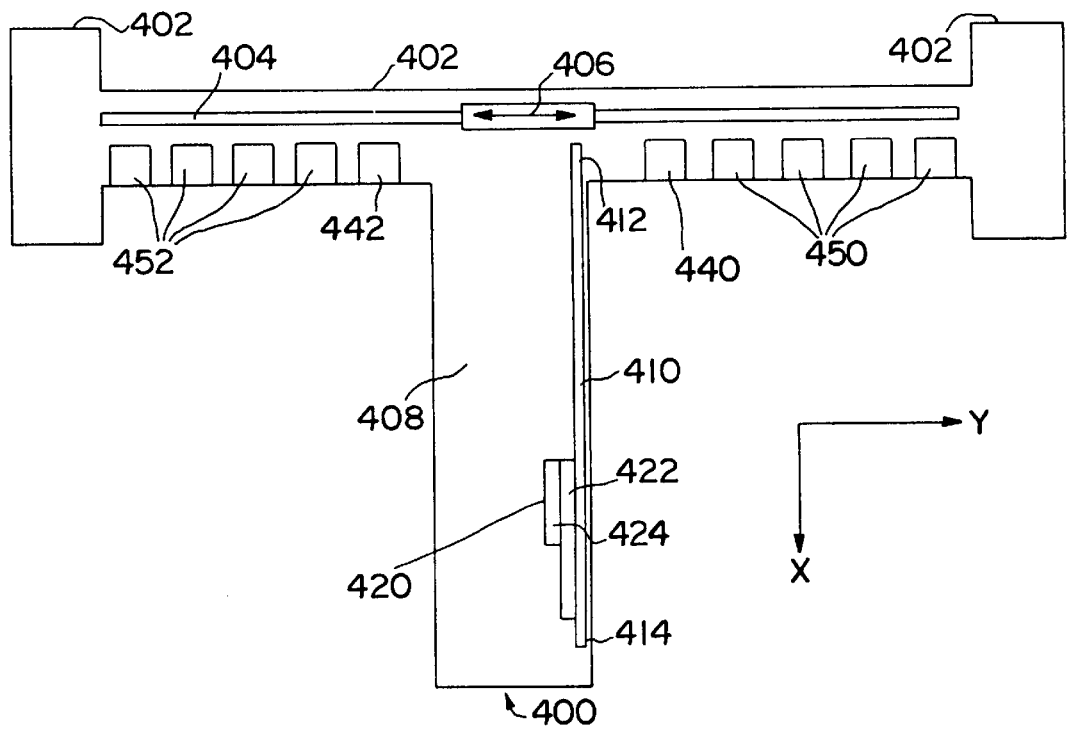
FIG. 5a is a top view of Applicants' automated data storage system illustrating the first step in Applicants' method to remove a data accessor from a media storage library.

Referring to FIG. 5a, automated data storage system 400 is shown including media storage library 402 and maintenance bay 408. Media storage library 402 includes a plurality of media storage slots 450 and 452 in which are stored a plurality of portable data storage media. Media storage library 402 further includes one or a plurality of data storage drives, such as drives 440 and 442, for reading and/or writing data on the accessed media.

Rail system 404 is internally disposed within library 402. In a preferred embodiment, rail system 404 includes two parallel rails. Rail system 410 is disposed internally within maintenance bay 408, and has first end 412 and second end 414. In a preferred embodiment, rail system 410 includes two parallel rails.

First end 412 of rail system 410 is disposed adjacent to, and substantially perpendicular with, rail system 404. By substantially perpendicular with, Applicants mean the angle formed between rail system 404 and first end 412 of rail system 410 is about 90 degrees, plus or minus about 10 degrees.

Accessor 406 is movably disposed on rail system 404, and travels bi-directionally along rail system 404 in the +/-Y direction. Accessor 406 is formed as described above, and as shown in FIG. 1a. Maintenance robot 420 is formed as described above and as shown in FIG. 2, and comprises frame 422 with pivotable support member 424 disposed thereon. Maintenance robot 420 is movably disposed on rail system 410 and travels bi-directionally along rail system 410 in the +/-X direction.

In FIG. 5a support member 424 is disposed in a first position wherein member 424 is adjacent to, and parallel to, frame 422. In addition, maintenance robot 420 is shown disposed adjacent second end 414 of rail system 410.

Figure 5B:
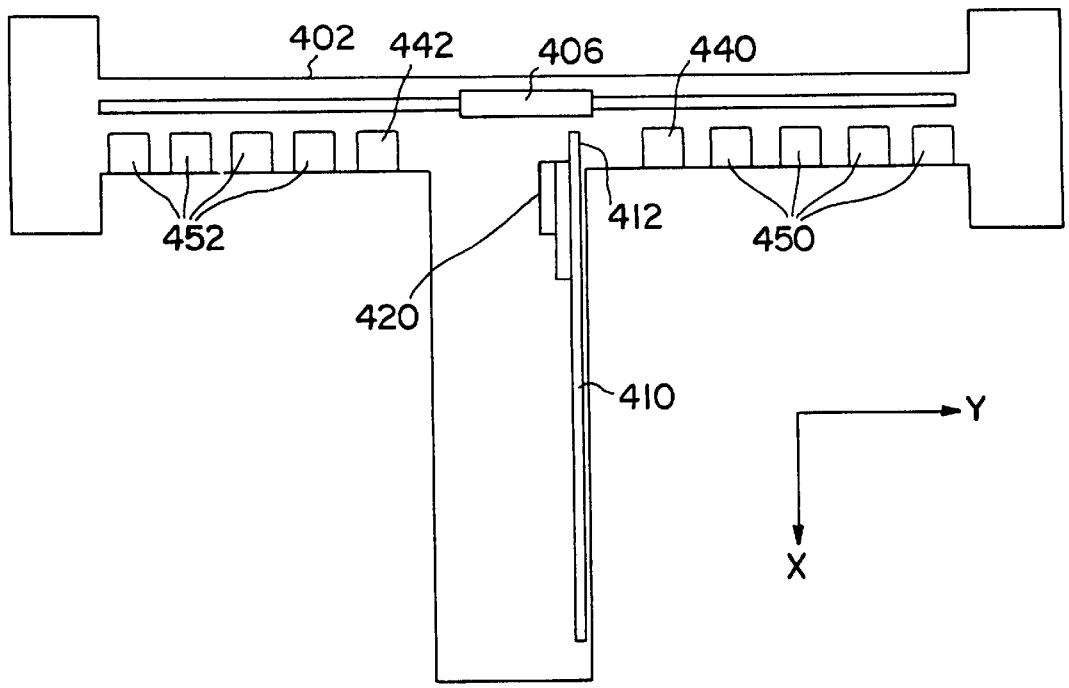
FIG. 5b is a top view of Applicants' automated data storage system illustrating the second step in Applicants' method to remove a data accessor from a media storage library.
Figure 5C:
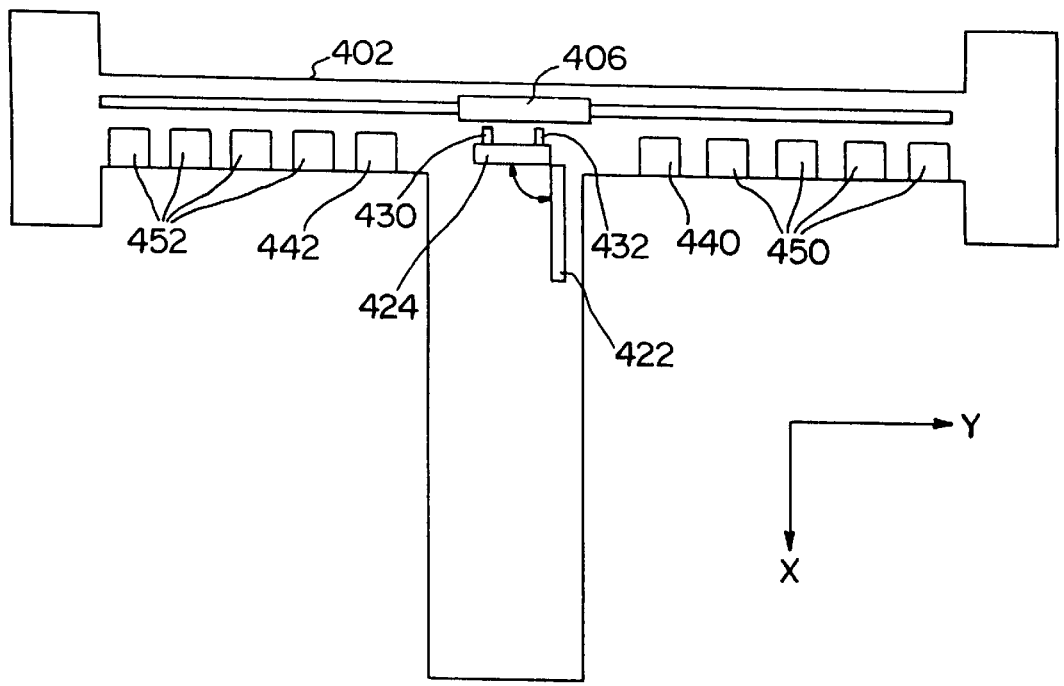
FIG. 5c is a top view of Applicants' automated data storage system illustrating the third step in Applicants' method to remove a data accessor from a media storage library.

Referring now to FIG. 5b, accessor 406 is positioned adjacent end 412 of rail system 410, and maintenance robot 420 is positioned adjacent end 412 and adjacent accessor 406. In the next step as shown in FIG. 5c, support member 424 is rotated outwardly from frame 422 until substantially perpendicular to frame 422. "Substantially perpendicular" has the meaning recited above. For purposes of clarity, rail system 410 is not shown in FIGS. 5c–5f. As shown in FIG. 5c, engagement rods 430 and 432 are disposed on the surface of support member 424 having a facing relationship with accessor 406.

Figure 5D:
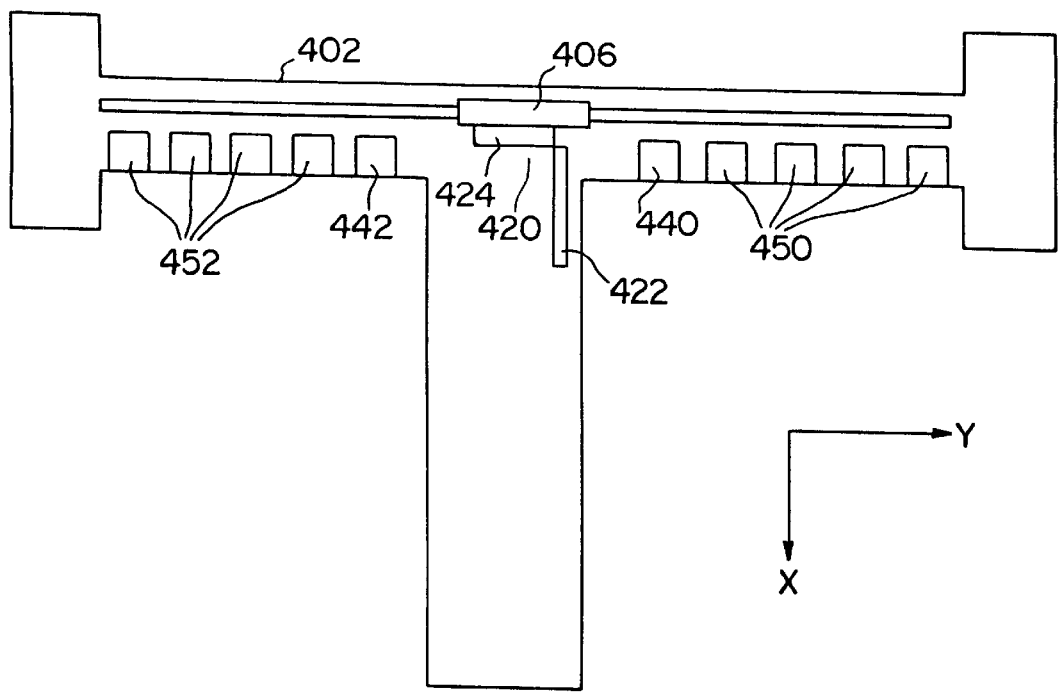
FIG. 5d is a top view of Applicants' automated data storage system illustrating the fourth step in Applicants' method to remove a data accessor from a media storage library.

As shown in FIG. 5d, robot 420 is next moved on rail system 410 (not shown in FIG. 5d) to insert engagement rods 430 and 432 into slots 50 (FIG. 1a) and 52 (FIG. 1a) disposed on accessor 406. Referring now to FIG. 1a, motors 28 and 36 are activated to retract wheels 22 and 30 from rail system 404. Engagement rods 430 and 432 are then raised (or lowered depending on the orientation of accessor 406) to remove wheel 48 (FIG. 1a) from rail system 404.

Referring to the embodiment shown in FIG. 3a, motors 220 and 230 are activated and rotated in such a manner to either raise or lower engagement rods 224 and 234, thereby raising or lowering accessor 406, as required to remove wheel 406 from rail system 404. Referring to the embodiment shown in FIG. 4, motors 310 and 320 are activated and operated in such a manner to either raise or lower engagement rods 314 and 324, thereby raising or lowering accessor 406, as required to remove wheel 48 from rail system 404.

After retracting wheels 22 and 30, and moving wheel 48, accessor 406 is no longer disposed on rail system 404. Rather, accessor 406 is now removably attached to maintenance robot 420.

Figure 5E:
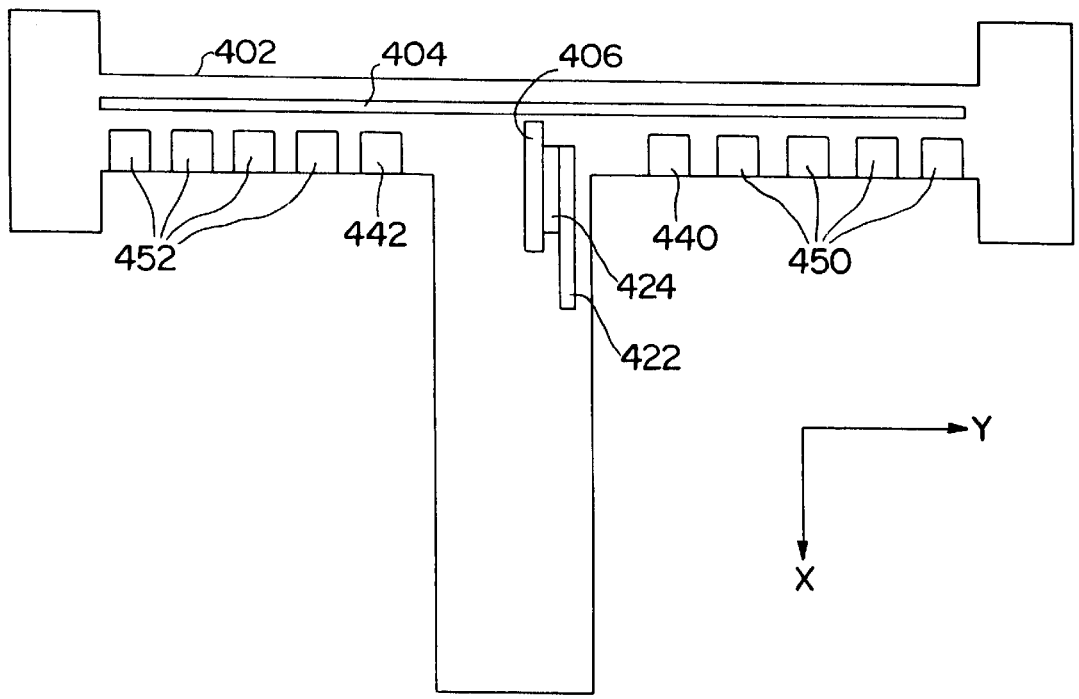
FIG. 5e is a top view of Applicants' automated data storage system illustrating the fifth step in Applicants' method to remove a data accessor from a media storage library.
Figure 5F:
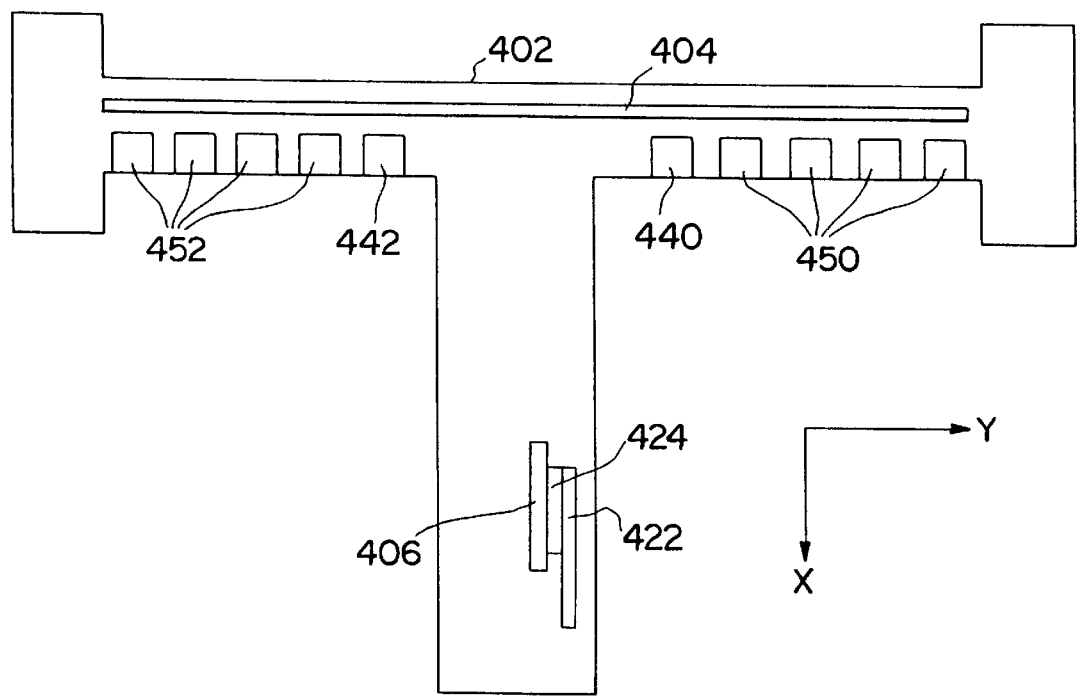
FIG. 5f is a top view of Applicants' automated data storage system illustrating the sixth step in Applicants' method to remove a data accessor from a media storage library.

Referring now to FIG. 5e, support member 424 is rotated inwardly such that support member 424, which now carries accessor 406, returns to its first position, i.e. adjacent to and parallel to frame 422. Referring to FIG. 5f, robot 420, and the attached accessor 406, are next moved to end 414 of rail system 410, and thereby, out of library 402.

We claim:

1. An automated data storage system, comprising:
   a first rail system comprising a first rail and a second rail;
   an accessor moveably disposed on said first rail system;
   a second rail system having a first rail, a second rail, a first end and a second end wherein said first end is disposed adjacent said first rail system;
   a maintenance robot movably disposed on said second rail system;
   wherein said accessor comprises:
      a first frame formed to include an attachment slot;
      a first wheel rotatably disposed on said frame;
      a second wheel rotatable disposed on said frame, wherein said first wheel and said second wheel are moveably disposed on said first rail of said first rail system;
      a pillar having a first end and a second end, wherein said first end connects to said frame;
      an accessing mechanism movably disposed on said pillar such that accessing mechanism travels bi-directionally along said pillar, wherein said accessing mechanism comprises a robotic manipulator mounted on a moveable carriage;
      a third wheel rotatably disposed on said second end of said pillar, wherein said third wheel is moveably disposed on said second rail of said first rail system;
      a first motor disposed on said pillar, wherein said first motor connects to said third wheel such that operation of said first motor in a first direction causes said third wheel to rotate in a first direction, and wherein operation of said first motor in a second direction causes said third wheel to rotate in a second direction;
   wherein said maintenance robot comprises:
      a second frame having a bottom member, a top member, and a first support member;
      a second motor disposed on said first support member;
      a moveable attachment device disposed on said first support member, wherein said second motor is connected to said moveable attachment device;
      a fourth wheel and a fifth wheel disposed on said top member, wherein said fourth wheel and said fifth wheel are moveably disposed on said first rail of said second rail system;
      a sixth wheel and a seventh wheel disposed on said bottom member, wherein said sixth wheel and said seventh wheel are moveably disposed on said second rail of said second rail system;
      a third motor disposed on said bottom member and connected to said fourth wheel;
      wherein said attachment device can be inserted into said attachment slot and subsequently removed therefrom.

2. The automated data storage system of claim 1, wherein said accessor comprises a plurality of attachment slots, and wherein said attachment device comprises a plurality of engagement rods each of which can be inserted into one of said plurality of attachment slots and subsequently removable therefrom.

3. The automated data storage system of claim 2, further comprising a third rail system, wherein said second end of said second rail system is disposed adjacent to and substantially perpendicular to said third rail system.

4. The automated data storage system of claim 1, wherein said top member comprises a first end and a second end, and wherein said bottom member comprises a first end and a second end, further comprising:
  a first side member attached to said first end of said top member and said first end of said bottom member, and a second side member attached to said second end of said top member and said second end of said bottom member;
  wherein said first support member has a proximal end and a distal end, and wherein said proximal end is pivotably attached to said first end of said top member;
  wherein said fourth wheel is rotatably mounted on said first end of said bottom member, said fifth wheel is rotatably mounted on said second end of said bottom member, said sixth wheel is rotatably mounted on said first end of said top member, and said seventh wheel is rotatably mounted on said second end of said top member.

5. The automated data storage system of claim 4, wherein said maintenance robot further comprises a second support member having a top end a bottom end, wherein said top end connects to said distal end of said first support member and wherein said bottom end connects to said first side member.

6. The automated data storage system of claim 5, wherein said attachment device further comprises an engagement rod.

7. The automated data storage system of claim 6, wherein said engagement rod has a cross section selected from the group consisting of circular, ovoid, triangular, square, rectangular, pentagonal, and hexagonal.

8. The automated data storage system of claim 2, wherein each of said plurality of engagement rods is independently movable.

* * * * *